(12) United States Patent
Konno et al.

(10) Patent No.: US 7,326,138 B2
(45) Date of Patent: Feb. 5, 2008

(54) GUIDE FOR TRANSMISSION DEVICE

(75) Inventors: Masahiko Konno, Osaka (JP);
Sadayuki Nagatomo, Osaka (JP)

(73) Assignee: Tsubakimoto Chain Co., Oskaka (JP)

( * ) Notice: Subject to any disclaimer, the term of this patent is extended or adjusted under 35 U.S.C. 154(b) by 601 days.

(21) Appl. No.: 10/932,891

(22) Filed: Sep. 2, 2004

(65) Prior Publication Data

US 2005/0096167 A1    May 5, 2005

(30) Foreign Application Priority Data

Oct. 30, 2003    (JP)    ............................ 2003-370727

(51) Int. Cl.
    *F16H 7/08*    (2006.01)
    *F16H 7/18*    (2006.01)
(52) U.S. Cl. ...................... 474/111; 474/140
(58) Field of Classification Search ............... 474/111, 474/140, 109, 138; 428/43, 517, 520
    See application file for complete search history.

(56) References Cited

U.S. PATENT DOCUMENTS

| 4,832,664 | A | * | 5/1989 | Groger et al. | .............. 474/111 |
| 5,184,983 | A | * | 2/1993 | Shimaya et al. | ............ 474/111 |
| 5,318,482 | A | * | 6/1994 | Sato et al. | .................... 474/111 |
| 5,813,935 | A | * | 9/1998 | Dembosky et al. | ......... 474/111 |
| 6,036,613 | A |   | 3/2000 | Diehm | |
| 6,890,277 | B2 | * | 5/2005 | Inoue et al. | ................. 474/111 |

FOREIGN PATENT DOCUMENTS

| DE | 195 23 912 A1 | | 3/1997 |
| DE | 19905579 A1 | * | 8/2000 |
| EP | 1 267 097 A1 | | 12/2002 |
| EP | 1 291 553 A2 | | 3/2003 |
| JP | (10-213192 A | * | 8/1998 |
| JP | 2004-125139 | | 4/2004 |

* cited by examiner

*Primary Examiner*—Marcus Charles
(74) *Attorney, Agent, or Firm*—Howson & Howson LLP

(57) ABSTRACT

In a guide for a timing chain, a slide rail and a rail support are formed by sandwich molding. The rail support includes a core formed of a glass fiber reinforced polyamide 66 resin and a skin layer formed of a polyamide 66 resin. The slide rail is composed entirely of a polyamide 66 resin and is continuous with the skin layer of the rail support. A narrow connecting region formed of polyamide 66 resin is disposed between the rail support and the slide rail. The narrow connecting region prevents the glass fiber-reinforce resin from entering the slide rail in the sandwich molding process.

2 Claims, 4 Drawing Sheets

GUIDE FOR TRANSMISSION DEVICE

FIELD OF THE INVENTION

This invention relates to a guide for a roller chain, a silent chain, a belt, or similar endless, flexible, power transmission device of the kind used to transmit power from a driving sprocket to one or more driven sprockets, for example, in the timing drive of an automobile engine.

BACKGROUND OF THE INVENTION

A fixed guide and a movable guide, both of which are In sliding contact with a flexible transmission medium, may be used respectively to guide the transmission medium and maintain proper tension therein in order to prevent vibration and wobbling of the transmission medium, and to prevent transmission failure due to excess tension or excessive loosening of the medium.

The guide 500 shown in FIG. 4 is an example of a chain guide which exhibits excellent mechanical strength and wear resistance. In this guide, a core 510a of a slide rail 510 extending along the direction of travel of the transmission medium, and a core 520a of a support 520, which supports the slide rail 510, are formed as a unit from a glass fiber reinforced polyamide 66 resin. The entire structure consisting of both cores is covered by a skin composed of a polyamide 66 resin. The skin consists of a layer 510b, coating the outer surface of the core 510a of the slide rail 510, and a layer 520b, coating the outer surface of the core 520a of the rail support 520. Details of the guide structure and composition are described in the specification of Japanese patent publication No. 2004-125139 at page 2, and shown in FIGS. 3 to 6.

As shown in FIG. 4, the core 510a of the slide rail 510 and the core 520a of the rail support 520 are integrally fused to each other when the cores are molded, and are reinforced by coating the entire guide with a polyamide 66 resin. Thus, a strong connection is provided between the slide rail 510 and the rail support 520 so that the chain can be guided, and tension can be maintained over a long period of time.

In the conventional guide 500, the skin layer 510b formed in the slide rail 510, on which the chain slides is thin. When this skin layer 510b wears, the core 510b becomes exposed, and the glass fibers contained in the fiber-reinforced polyamide 66 resin exert an abrasive action similar to that of an abrasive material between the guide and the chain. Thus, the exposed glass fibers can promote wear of the guide.

In the operation of the conventional guide, both the skin layer 510b and the core 510a accumulate heat. However, because of the difference in the thermal properties of the glass fiber reinforced polyamide 66 resin forming the core 510a and the polyamide 66 resin forming the skin layer 510b, thermal deformation occurs between the skin layer 510b and the core 510a. If the difference in thermal properties is excessive, cracks are generated and the core 510a and the skin layer 510b may separate, causing reduction in the strength of the guide.

Accordingly, an object of the invention is to solve the above-mentioned problems encountered in prior art guides, and to provide a guide which suppresses heat accumulation in the rail on which the transmission medium slides, so that thermal deterioration is reduced, and smooth sliding contact with the traveling transmission medium, and satisfactory strength, are maintained over a long period of time.

SUMMARY OF THE INVENTION

The guide in accordance with the invention comprises an elongated slide rail adapted for sliding contact with a transmission medium traveling in the direction of elongation of the slide rail, and a rail support which extends along the slide rail in the direction of elongation and supports the slide rail. The slide rail and the rail support are sandwich molded. The rail support includes a core composed of a glass fiber-containing high-strength polymer and a skin layer composed of a wear-resistant polymer. The slide rail is composed of the same wear-resistant polymer of which the skin layer is composed, and is unitary with the skin layer on the rail support. A narrow connecting region, narrower than the slide rail and also narrower than the rail support, and composed of the same wear resistant polymer as that of which the skin layer and slide rail are composed, is disposed between, and integrally connected to, the rail support and the slide rail.

In one embodiment of the invention, reinforcing ribs, integrally connected to the slide rail at intervals along the length thereof in the direction of elongation, are provided on opposite sides of the rail support and the narrow connecting region.

The slide rail, which is in sliding contact with a transmission medium when the guide is in use, is composed of a single polymer resin material. Consequently even when frictional heat is generated due to sliding contact of the slide rail with the transmission medium, cracks, separation, and thermal deterioration are reduced. Furthermore, even if a large amount of wear of the slide rail occurs, excessive friction resulting from exposure of glass fibers is avoided, and smooth sliding contact of the transmission medium with the guide chain can be realized over a long period of time.

Since a narrow connecting region, composed only of the polymer resin material of the slide rail and the skin layer of the rail support, intervenes between the rail support and the slide rail, cracks, separations and the like, which are apt to arise at the boundary of different polymer resins in the slide rail of a conventional sandwich-molded guide, are prevented. Furthermore, since internal heat generated in the slide rail is dissipated by the slide rail, conduction of heat to the rail support can be suppressed, and thermal deterioration of the rail support can be reduced.

In the case where reinforcing ribs protrude from the sides of the rail support and the narrow connecting region, the back of the slide rail is reliably supported, and superior guide strength can be exhibited over a long period of time.

DETAILED DESCRIPTION OF THE PREFERRED EMBODIMENT

Figure 4:
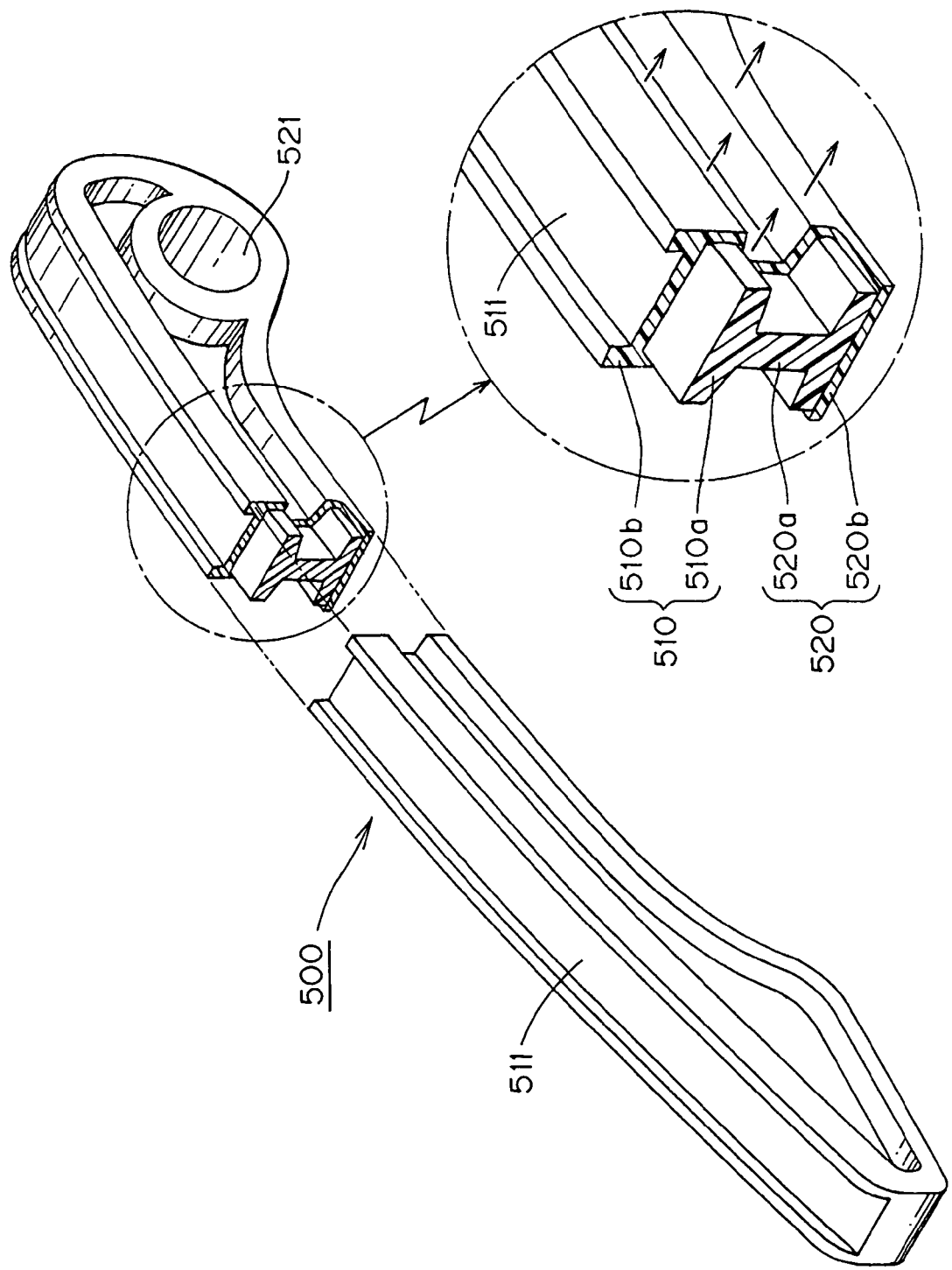
FIG. 4 is a similar broken-away perspective view of a conventional guide.

The guide in accordance with the invention, on which a traveling transmission medium slides, can be a fixed guide for preventing vibration or wobbling of the transmission medium, or a movable guide, which maintains proper tension in the transmission medium in order to prevent excessive tension and excessive loosening of the medium. The invention will be described with reference to an embodiment which serves as a movable guide. As in the case of the conventional guide depicted in FIG. 4, the guide in accordance with the invention comprises, as its two principal components, a slide rail on which the traveling transmission medium slides, and a rail support.

To suppress heat accumulation in the slide rail, and reduce thermal deterioration so that a traveling transmission medium can slide smoothly over the guide for a long period of time, the guide in accordance with the invention comprises a slide rail, and a sandwich-molded rail support. The rail support includes a core of glass fiber-containing high-strength polymer and a skin layer formed of a wear resistant polymer which also forms the slide rail. A narrow connecting region, formed of the same polymer of which the skin layer is formed, is disposed between the rail supporting and the slide rail.

Sandwich molding is a known method of producing a molded product composed of two kinds of resin materials, in which one of the material serves as a core, and the other serves as a skin. The two materials are injected, in a molten state, either simultaneously or substantially simultaneously, into a mold having an inside shape corresponding to the intended external shape of the molded product.

Injection molding machines for sandwich molding are provided with various sandwich nozzles. In the case of an injection molding machine provided with a parallel type sandwich nozzle, torpedo, that is, a switching member, is moved back and forth in order to inject either the polymer resin for the skin layer or the polymer resin for the core. The torpedo makes it possible for the ratio of the amounts of the injected materials, and the injection speeds, to be very carefully controlled.

The materials of the first and second polymer resins are not particularly limited. However, because the two resins are fused at their boundary region during sandwich molding, the materials preferably have chemical affinity, and similar shrinkage properties. Suitable materials include commercially available polyamide resins such as a polyamide 6 resin, a polyamide 66 resin, a polyamide 46 resin, all aromatic polyamide resins, glass fiber-reinforced polyamide resins, and the like.

The shape of the narrow connecting region between the rail support and the slide rail prevents the polymer resin forming the core of the rail support from entering the slide rail during sandwich molding. The appropriate shape and structure of the narrow connecting region can be readily determined by taking into account the composition of the polymer resin materials, their thermal properties, the injection molding speed, injection molding temperature, and the like.

Figure 1:
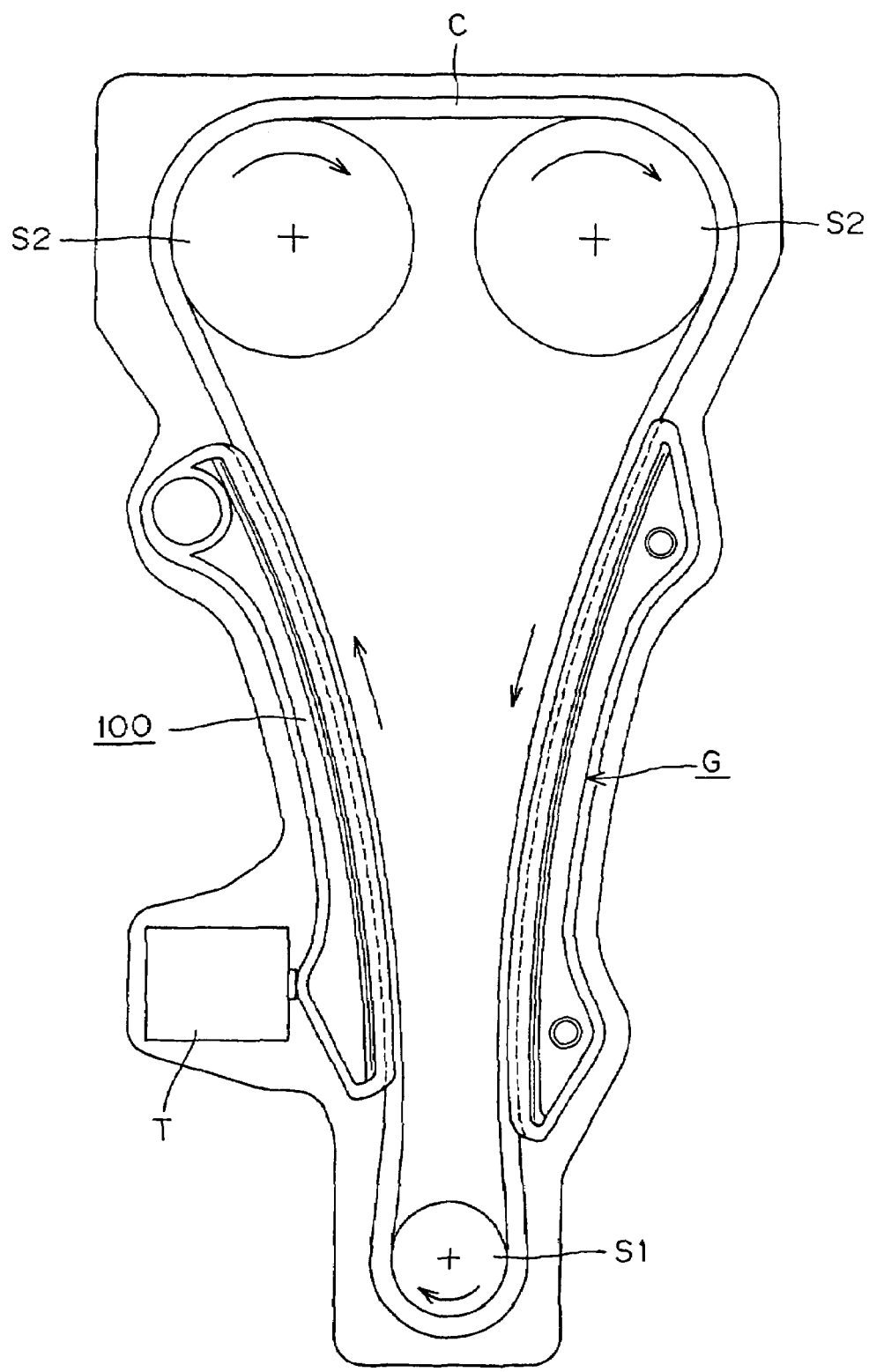
FIG. 1 is a schematic elevational view of the timing transmission of an internal combustion engine, in which a guide and a tensioner lever in accordance with the invention are used.

As shown in FIG. 1, the guide 100 is a movable guide used to maintain chain tension in the timing transmission of an automobile engine, in which power is transmitted by a chain C, which travels around a driving sprocket S1 and two driven sprockets S2. The guide 100 is used as a movable guide, also known as a tensioner lever, which maintains proper tension in the chain C, which slides on the guide.

Figure 2:
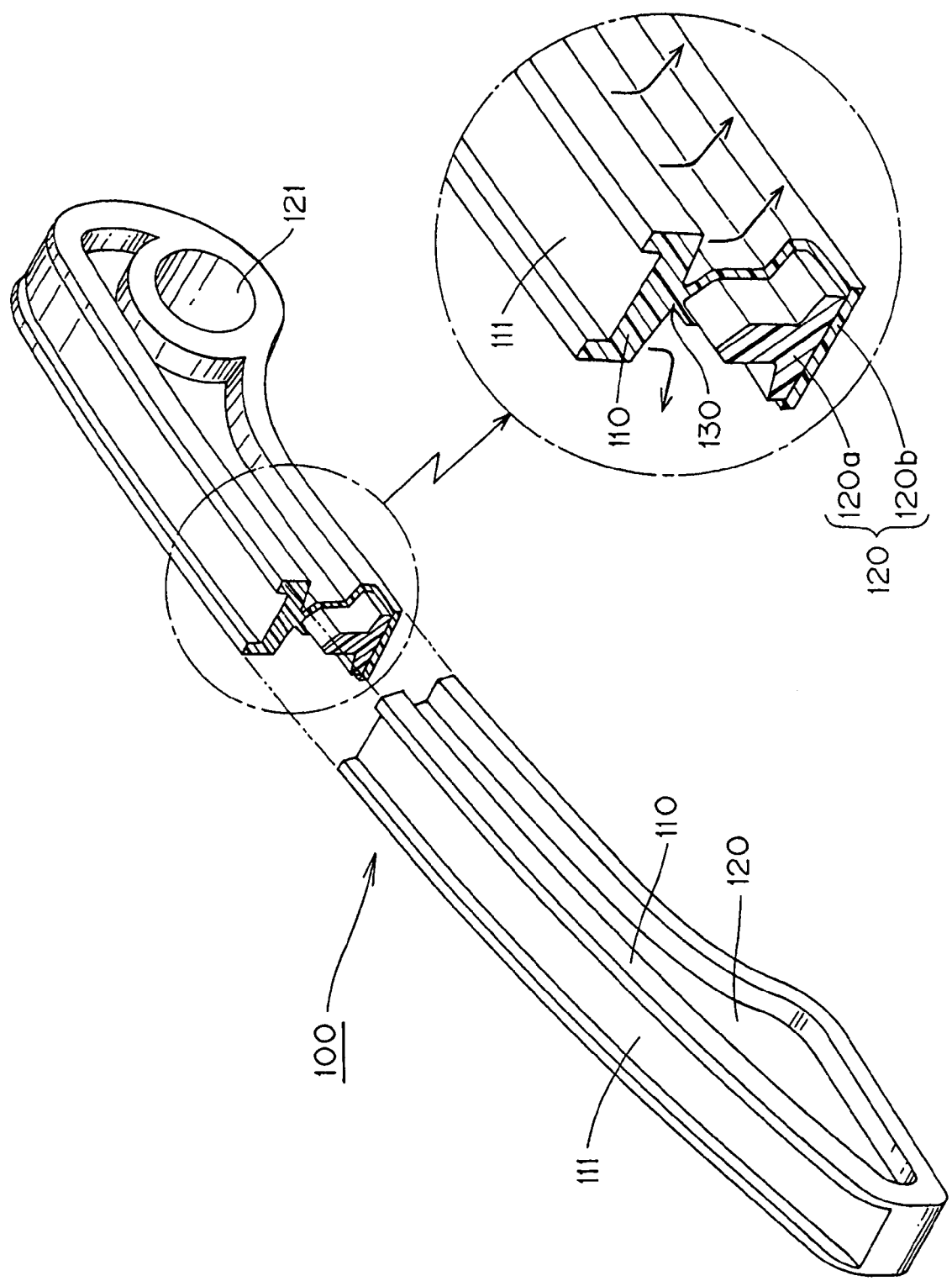
FIG. 2 is a broken-away perspective view of a guide in accordance with a first embodiment of the invention, including an enlargement of a cross-section of the guide.

As shown in FIG. 2, the guide 100 comprises a slide rail 110, including an arc-shaped sliding contact surface 111 on the front of the rail extending along the direction of travel of the transmission chain. A rail support 120 extends perpendicularly from the back of the slide rail, and lengthwise along the slide rail. A boss 121 is provided on the rail support adjacent one end of the guide 100. This boss 121 has a mounting hole for mounting this guide on a pivot shaft extending from a wall of an engine block.

The rail support 120 is adapted to support the slide rail 110 in the longitudinal direction of the guide so that the strength required in the high temperature environment of an automotive engine can be maintained at high level over a long period of time. A high strength first polymer resin material, composed of a glass fiber-reinforced polyamide 66 resin, is preferably used as the core layer 120a of the rail support 120. A wear-resistant second polymer resin material composed of a polyamide 66 resin is preferably used as the skin layer 120b of the rail support 120.

Although a glass fiber reinforced polyamide 66 resin is preferred as the core material for the rail support, other polymer resin materials can be used, provided that they are capable of exhibiting high strength while the guide applies tension to the transmission medium over a long period of time. Resins such as polyamide 46 resin, or an aromatic polyamide resin other than polyamide 66, can be used, for example. Furthermore, although polyamide 66 is preferred as the material of the slide rail and the skin layer of the rail support, other polymer resin materials which exhibit wear resistance while in sliding contact with a transmission chain over a long period of time can be used. For example, a polyamide 46 or an aromatic polyamide resin other than polyamide 66 may be used.

The slide rail 110 shown in FIG. 2, is composed entirely of a wear resistant second resin material, preferably the same polyamide 66 resin which forms the skin layer 120b of the rail support 120. The slide rail 110 is integrally fused with the skin layer 120b of the rail support 120 through the narrow connecting region 130. As a result, the slide rail 110 and the core 120a of the rail support 120 are integrated and reinforced, and thereby exhibit superior endurance.

The connecting region 130, which intervenes between the slide rail 110 and the rail support 120, is in the shape of a thin neck, and is narrow compared to the adjacent parts of the slide rail and the rail support. The connecting region 130 prevents the glass fiber-reinforced polyamide 66 resin of the core of the rail support from entering the slide rail during sandwich molding. The narrow connecting region 130 is preferably formed of the same polyamide 66 resin as in the skin layer 120b of the rail support 120 and the slide rail 110.

In the sandwich molding process for producing the guide 100, a polyamide 66 resin is injected into a single simple mold having an internal shape corresponding to the desired outer shape of the guide to be molded. The resin is injected through a sandwich nozzle in a sandwich molding machine to commence molding of the slide rail 110, the skin layer 120b of the rail support 120, and the narrow connecting region 130, all of which are exposed and form the entire outer surface of the guide. At the same time, or substantially the same time, as the commencement of the injection of the polyamide 66 resin which forms the slide rail, the skin layer and the connecting region, a glass fiber-containing polyamide 66 resin is injected to form the core layer of the rail support 120. The narrow connecting region 130 blocks the flow of the glass fiber-containing polyamide 66 resin into the slide rail 110. When the injection of resin is completed, the mold is cooled and the molded guide is removed.

In the guide 100, the rail support 120 includes a core layer formed of a glass fiber-reinforced polyamide 66 resin and a skin layer 120b formed of the same polyamide 66 resin which forms the slide rail 110. However, the slide rail 110, on which transmission medium slides, is composed entirely of polyamide 66 resin. Accordingly, frictional heat generated as a result of the sliding contact of the transmission medium with the slide rail 110 is generated, does not cause breakage as a result of cracks, separations, or the like, which occur in the case of a conventional sandwich-molded guide structure, where two or more different polymer resin materials are used in the slide rail. Moreover, reduction in guide strength due to thermal deterioration is decreased. Furthermore, even if the arc-shaped sliding contact surface 111 of the slide rail 110 becomes excessively worn, wear of the guide, which would be promoted by the exposure of glass fibers, is avoided, and smooth sliding contact with the transmission medium can be realized over a long period of time. Finally, internal heat generated in the slide rail 110 is dissipated without being conducted to the rail support 120. As a result, thermal deterioration of the rail support 120 can be suppressed. The arrows in the magnified part of FIG. 2 denote the flow of internal heat dissipated from the sides of the slide rail 110.

Since the entire guide 100 is formed of a polymer resin material, a significant reduction in the overall weight of the guide can be realized, and after removal of the guide from the transmission device, the guide can be recycled without disassembly and separation of parts.

Figure 3:
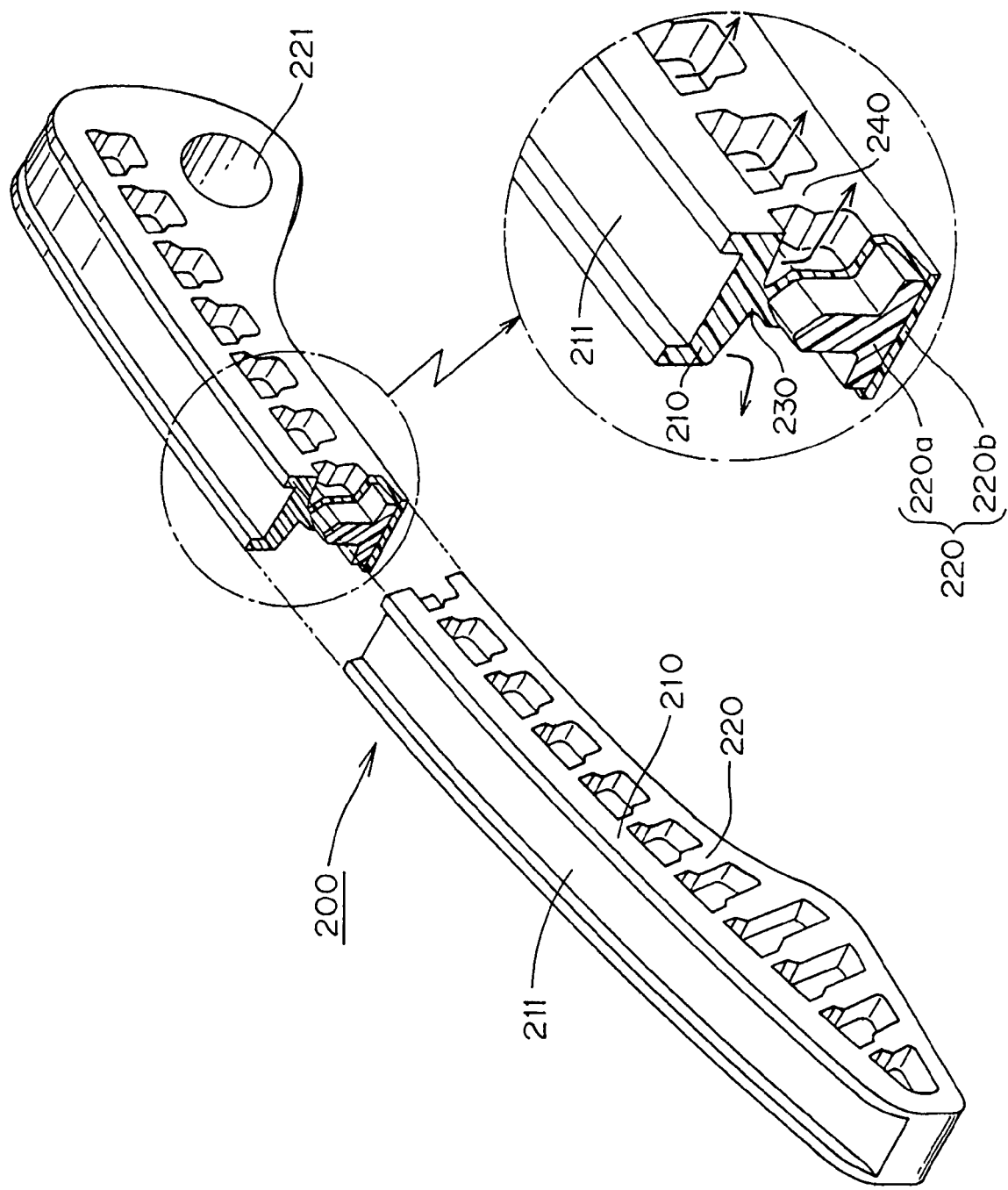
FIG. 3 is a similar broken-away perspective view of a guide in accordance with a second embodiment of the invention.

In the embodiment shown in FIG. 3, the basic structure of the guide 200 is substantially the same as that of the guide 100, shown in FIG. 2. However, in the guide 200, reinforcing ribs 240, which reinforce the slide rail 210, protruded from the sides of the rail support 220 and the narrow connecting region 230. These reinforcing ribs have the same composition as that of the skin layer 220b of the rail support 220 and the slide rail. The reinforcing ribs, the slide rail and the skin layer 220b are a unitary molded structure. The ribs extend from the back side of the slide rail to the laterally projecting parts of the rail support, and are preferably disposed at substantially uniform intervals along the length of the guide. The parts of the ribs adjacent the back side of the slide rail are relatively narrow, while the parts of the ribs adjacent to the laterally projecting parts are wider. The ribs support the back of the slide rail 210, and impart additional strength to the guide, allowing the guide to exhibit a high degree of strength over a long period of time, for improved reliability.

As mentioned previously, although the invention has been described with reference to embodiments designed to serve as movable guides or tensioner levers, many of the advantages of the invention can be realized in a fixed, sandwich-molded guide having a similar structure, comprising a slide rail molded as a unit with the skin layer of a rail support, and having a narrow connecting region, composed of the same material as that of the skin layer and the slide rail, for preventing entry of the core material of the rail support into the slide rail in the sandwich molding process.

We claim:

1. A guide for an endless flexible transmission medium, comprising an elongated slide rail adapted for sliding contact with a transmission medium traveling in the direction of elongation of the slide rail, and a rail support which extends along the slide rail in the direction of elongation and supports the slide rail, said slide rail and rail support being sandwich molded, wherein said rail support includes a core composed of a glass fiber-containing high-strength polymer and a skin layer composed of a wear-resistant polymer;

wherein said slide rail is composed of the same wear-resistant polymer of which said skin layer is composed, said slide rail and the skin layer on the rail support being unitary;

wherein the slide rail is separated from said glass fiber-containing high-strength polymer by a space; and wherein a narrow connecting region, narrower than the slide rail and also narrower than the rail support, and composed of the same wear resistant polymer as that of which the skin layer and slide rail are composed, is disposed within said space, and located between, and integrally connected to, the rail support and the slide rail.

2. The guide for a transmission device according to claim 1, in which reinforcing ribs, integrally connected to the slide rail at intervals along the length thereof in the direction of elongation, are provided on opposite sides of the rail support and the narrow connecting region.

* * * * *